United States Patent [19]

Wagner

[11] 4,073,242

[45] Feb. 14, 1978

[54] SEWAGE SLUDGE DISPOSAL

[75] Inventor: William F. Wagner, Brigham City, Utah

[73] Assignee: Thiokol Corporation, Newtown, Pa.

[21] Appl. No.: 795,047

[22] Filed: May 9, 1977

Related U.S. Application Data

[63] Continuation-in-part of Ser. No. 644,479, Dec. 29, 1975, abandoned.

[51] Int. Cl.² ............................................. F23G 5/02
[52] U.S. Cl. .................................. 110/8 R; 110/8 P; 210/67; 210/70; 210/73 S
[58] Field of Search ............... 110/7 B, 7 S, 8 R, 8 P; 210/10, 12, 49, 65, 66, 67, 70, 73 S, 152, 138, 259, 262, 295

[56] References Cited

U.S. PATENT DOCUMENTS

| 482,052 | 9/1892 | Wilson | 210/262 |
|---|---|---|---|
| 2,094,909 | 10/1937 | Baily et al. | 210/262 |
| 2,138,349 | 11/1938 | Mallory | 210/63 |
| 3,516,777 | 6/1970 | Hines et al. | 110/7 B |
| 3,655,048 | 4/1972 | Pergola | 210/152 |
| 3,915,857 | 10/1975 | Olson | 210/138 |

*Primary Examiner*—Kenneth W. Sprague

*Attorney, Agent, or Firm*—Stanley A. Marcus; Edward E. McCullough

[57] ABSTRACT

A slanted sieve is used to drain liquid out of sewage and to concentrate the sludge, the liquid being drained into a first tank and the sludge allowed to slide into an adjacent, second tank. The sludge is drawn from the second tank into a macerating pump where it is ground and dumped into a third or incinerator-feed tank. A second pump forces the sludge from this tank through a pipe and into an incinerator, where the sludge is formed into droplets and dispersed over the fire by a blower that forces air at substantially right angles to the opening of the pipe. To prevent settling out of heavy, solid particles in the sludge, and clogging of the apparatus, the sludge must be moved therethrough at a velocity too great for feeding the sludge into the incinerator. An automatic timer operates a three-way valve between the second pump and the incinerator, that alternately directs sludge into the incinerator in powerful spurts against a blast of air, and diverts it back into the incinerator-feed tank. This method of delivering sludge to the incinerator also helps to insure thorough atomization of the sludge, and permits use of a smaller incinerator than would otherwise be necessary.

4 Claims, 1 Drawing Figure

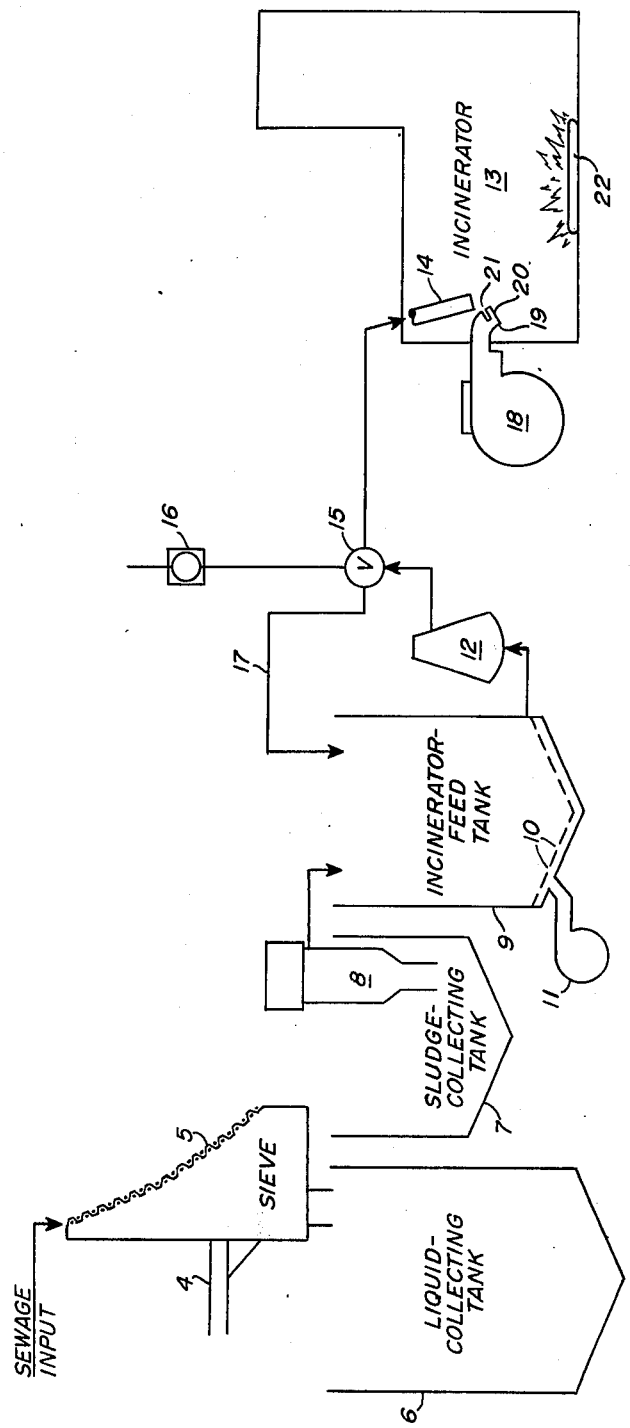

SEWAGE SLUDGE DISPOSAL

CROSS-REFERENCES TO RELATED APPLICATIONS

This application is a continuation-in-part of my Application Ser. No. 644,479, filed Dec. 29, 1975, now abandoned, titled "Sewage Sludge Disposal."

BACKGROUND OF THE INVENTION

This invention relates broadly to sewage treatment. More specifically, it relates to apparatus and methods for separation and incineration of the sludge content of sewage. This invention was made in the course of or under a contract with the U.S. Navy.

Apparatus and methods for separating sludge from sewage and incinerating it are known in the art. For example, apparatus for treating sewage sludge and delivering it to an incinerator are taught in U.S. Pat. No. 2,094,909 to R. W. Baily et al and in U.S. Pat. No. 3,516,777 to E. W. Hines et al. However, the prior art does not teach delivery of the sludge to the incinerator in periodic, powerful spurts, as in the present invention. This helps to solve the problem of clogged pipes, and provides other benefits.

SUMMARY OF THE INVENTION

According to the present invention, sewage is dumped onto a sieve that is positioned over a liquid-collecting tank, but which is inclined so that the sludge slides into an adjacent, sludge-collecting tank. A macerating pump draws the sludge from this tank, grinds it to eliminate long fibers and large particles and dumps it into a third or incinerator-feed tank. A second pump conveys the sludge to an incinerator via a pipe, and a blower forces a concentrated stream of air against the end of the pipe in the incinerator to break the sludge into droplets as it emerges from the pipe and to disperse it over the flames in the incinerator. Since a much greater sludge velocity is required to keep the sludge moving through the apparatus without clogging than can be tolerated in the incinerator, a three-way valve, operated by an automatic timer, alternately routes the sludge through the pipe to the incinerator in sudden, powerful spurts against blasts of air and diverts it through the pipe that leads back into the incinerator-feed tank. A means of agitating the sludge keeps it uniform in density and consistency in the incinerator-feed tank.

Objects of the invention are to provide a trouble-free apparatus and method for disposing of sewage sludge that will minimize clogging of the apparatus and will not pollute water. Another object is to minimize the size of the incinerator and to promote complete atomizing of the sludge in the incinerator. Other objects and advantages of the invention will become apparent as the following detailed description is read with reference to the accompanying drawing.

BRIEF DESCRIPTION OF THE DRAWING

In the Drawing

The FIGURE is a schematic diagram of the apparatus of the invention.

DESCRIPTION OF THE PREFERRED EMBODIMENTS

In reference to the FIGURE, a supporting structure 4 supports a C. E. Bauer Hydrasieve 5, or other sieve means capable of separating particles of about 0.020 in. (0.05 cm) diameter and greater from sewage. This sieve is positioned over a liquid-collecting tank 6, so that most of the liquid content will drain into the tank 6. It is also inclined at an average of about 55° to the horizontal, so that the resulting sludge will slide into the sludge-collecting tank 7. Further treatment of the liquid collected in the tank 6 is the subject of other patents and applications, and is not a part of the present invention.

A macerating pump 8 draws the sludge from the tank 7, grinds it, and delivers it to the incinerator-feed tank 9. The macerating pump 8 pulverizes large particles and chops up long fibers that would otherwise tend to clog the apparatus. In the incinerator-feed tank 9, the sludge is continually agitated to maintain a uniform consistency and density. Any means of agitating the sludge could be used, but, in a preferred embodiment, compressed air is forced through a system of orifices 10 in a manifold at the bottom of the tank 9 by a blower 11.

A screw-type pump 12 transfers the sludge from the incinerator-feed tank 9 to the incinerator 13, through a pipe 14. To overcome the problem of clogging the apparatus, which is common in the prior art, the pump 12 forces the sludge through the apparatus at a volumetric velocity of about 2 gallons/min. in a ½ inch pipe, (7.5 liters/min. in a 1.25 cm pipe). This prevents settling out of the heavier solid particles and maintains a uniform consistency of the sludge.

However, the incinerator 13 cannot burn the sludge at the rate at which it must be forced through the apparatus to avoid clogging thereof. This problem is solved according to the present invention by a three-way valve 15 operated by an automatic timer 16. The valve alternately directs the stream of sludge into the pipe 14 to the incinerator 13, or diverts it into the pipe 17 leading back to the incinerator-feed tank 9. In this way, the sludge is metered into the incinerator 13 in forceful pulses or spurts. In the incinerator 13, the sludge is formed into droplets by blasts of air that coincide with the spurts of sludge, and are delivered at approximately right angles to the end of the pipe 14 by a blower 18 via a special pipe 19. This pipe 19 has a closed end 20 and a transversally extending slot 21 adjacent the end of the pipe 14. The pulse method of delivering sludge aids in the process of forming it into fine droplets that are spread by the blast of air into a fan-shaped formation over the flames in the incinerator 13.

In effect, the sludge is made to flow continuously through the closed loop of a first pipe 17 that leads from, and back into, the incinerator-feed tank 9 via the pump 12. It is forced through this loop fast enough to prevent clogging. Periodically, the sludge is diverted, in a short pulse, from this loop into a second pipe 14 that delivers the sludge to the incinerator 13.

The apparatus of the invention is of special interest for use in ships. Hence, compactness of the entire unit is of considerable importance. To this end, the incinerator 13 is made in rectangular forms, and the inner walls thereof are made of highly refractory silicon carbide. This material remains relatively unaffected by the high temperatures of the incinerator and by the corrosiveness of sea water and other materials in the sludge. Another desirable property of silicon carbide is its high rate of thermal conductivity, which maintains the inner walls of the incinerator at a uniform, high temperature. Because of this feature, the capacity of the incinerator 13 can be temporarily overloaded each time a spurt of sludge is introduced therein, that is, more sludge is introduced by each spurt that can be burned immediately and a thin film of sludge is deposited on the inner walls of the incinerator. However, because of the temperature and thermal conductivity of the walls, this film is rapidly burned off before the next spurt of sludge is delivered.

An unexpected result of this method of burning the sludge is that much smaller incinerator can be used, than would otherwise be necessary. This desirable result is also partially due to the fact that the average volume of sludge per unit of time that is delivered to the incinerator 13 is much less than that which is forced through the pipes of the apparatus in order to prevent clogging.

An alternative method of minimizing the size of the incinerator is to make the second pipe 14 of smaller diameter than the first pipe 17, but sufficiently short that clogging of the second pipe 14 is not a problem. Hence, the full volume of sludge that flows through the first pipe 17 is never delivered to the incinerator 13 per unit of time.

The incinerator 13 is equipped with a conventional oil burner 22 that reaches a temperature of about 1200° to 1400° F (641° to 760° C) and effectively burns the sludge according to the method described above.

The timer 16 that operates the three-way valve 15 is adjustable to regulate the frequency and duration of the pulses of sludge delivered to the incinerator 13. Hence, these pulses of sludge can easily be regulated for most effective incineration, regardless of the rate at which the sludge must be forced through the pipes to prevent clogging.

An invention has been described that advances the art of sewage treatment. It is especially advantageous for ships in that no water polluting effluent is discharged. Although the preferred embodiment has been described specifically with regard to details, it should be noted that many such details may be altered without departing from the scope of the invention, as it is defined in the following claims.

The invention claimed is:

1. The method for sewage sludge disposal comprising:
    Draining the liquid content from the sludge with a sieve;
    grinding the sludge;
    agitating the sludge in a tank to maintain uniform consistency and density thereof;
    pumping the sludge from the tank through a first pipe that discharges the sludge back into the tank, at a velocity great enough to avoid clogging the pipe;
    periodically diverting the sludge from the first pipe into a second pipe, so that the required flow velocity of the sludge in the second pipe is maintained but the average volumetric rate of sludge flow in the second pipe is less than the output of the first pipe; and
    discharging the sludge from the second pipe and spraying it in periodic spurts into an incinerator by means of forced air, whereby the average volume of sludge delivered per unit of time to the incinerator is less than that flowing through the first pipe, so that the incinerator can be smaller than would be necessary if the full output from the first pipe were delivered thereto.

2. The method of claim 1 wherein the capacity of the incinerator is overloaded by each spurt of sludge, so that the inside of the incinerator is temporarily coated therewith.

3. The method of claim 1 wherein the inner walls of the incinerator are of refractory, heat conductive material.

4. The method of claim 3 wherein the inner walls of the incinerator are made of silicon carbide.

* * * * *